United States Patent
Weger et al.

(10) Patent No.: US 9,927,527 B2
(45) Date of Patent: Mar. 27, 2018

(54) SATELLITE SIGNAL ACQUISITION USING ANTENNAS WITH BEAMFORMING ABILITIES

(71) Applicant: Rockwell Collins, Inc., Cedar Rapids, IA (US)

(72) Inventors: John J. Weger, Ely, IA (US); Kristal D. Long, Cedar Rapids, IA (US); Timothy R. Schroeder, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 341 days.

(21) Appl. No.: 14/836,165

(22) Filed: Aug. 26, 2015

(65) Prior Publication Data

US 2017/0059714 A1   Mar. 2, 2017

(51) Int. Cl.
*G01S 19/24* (2010.01)
*G01S 19/00* (2010.01)

(52) U.S. Cl.
CPC .................... *G01S 19/24* (2013.01)

(58) Field of Classification Search
CPC .......... G01S 19/24; G01S 19/21; G01S 3/325; H01Q 3/34; H01Q 3/267; H01Q 3/26; H01Q 3/28; H01Q 1/1257; H04B 7/18584; H04B 7/18586; H04B 7/18534
See application file for complete search history.

(56) References Cited

U.S. PATENT DOCUMENTS

| | | | | |
|---|---|---|---|---|
| 5,796,715 A | * | 8/1998 | Patterson et al. | H04B 7/18586 |
| 5,912,641 A | * | 6/1999 | Dietrich | H04B 7/18534 |
| 6,016,120 A | * | 1/2000 | McNabb et al. | H01Q 1/1257 |
| 6,157,621 A | * | 12/2000 | Brown et al. | H04B 7/18584 |
| 6,965,343 B1 | * | 11/2005 | Dybdal et al. | G01S 3/325 |
| 2002/0147032 A1 | * | 10/2002 | Yoon et al. | H01Q 3/26 |
| 2005/0007273 A1 | * | 1/2005 | Fowell et al. | H01Q 3/26 |
| 2005/0007274 A1 | * | 1/2005 | Fowell et al. | H01Q 3/26 |
| 2005/0007275 A1 | * | 1/2005 | Fowell et al. | H01Q 3/267 |
| 2006/0077097 A1 | * | 4/2006 | Dybdal et al. | H01Q 3/28 |
| 2008/0291079 A1 | * | 11/2008 | Chang | G01S 19/21 |
| 2012/0326925 A1 | * | 12/2012 | Chang | G01S 19/21 |
| 2014/0055302 A1 | * | 2/2014 | Jia | H01Q 3/34 |

* cited by examiner

*Primary Examiner* — Bernarr E Gregory
(74) *Attorney, Agent, or Firm* — Angel N. Gerdzhikov; Donna P. Suchy; Daniel M. Barbieri

(57) ABSTRACT

Signal acquisition methods and receivers utilizing such signal acquisition methods are disclosed. More specifically, a signal acquisition method may include: identifying a list of available beam patterns that an antenna unit is configured to provide; iteratively searching for satellite signals by controlling the antenna unit to utilize one of the list of available beam patterns in each iteration; determining whether a satellite signal is detected in each iteration; collecting ephemeris data of a satellite producing the satellite signal when the satellite signal is detected in each iteration; and controlling beamforming operations of the antenna unit for satellite signal acquisition based on the ephemeris data collected.

20 Claims, 4 Drawing Sheets

SATELLITE SIGNAL ACQUISITION USING ANTENNAS WITH BEAMFORMING ABILITIES

BACKGROUND

Satellite navigation systems, such as the Global Positioning System (GPS), utilize satellites to provide location and time information to GPS receivers. During initial acquisition of satellite signals, however, a GPS receiver may not have the precise time, satellite almanac, and user location information necessary to perform antenna beamforming operations to acquire satellite signals. A GPS receiver may therefore default to a "search the sky" mode of operation to search for all available satellites in the sky above the GPS receiver.

A GPS receiver typically performs the "search the sky" mode of operation by passing through and not manipulating its antenna gain pattern at all in order to simulate an omnidirectional gain pattern. It is noted, however, that the simulated omnidirectional gain pattern provided in this manner often incur significantly reduced gain, inhibiting the ability of the GPS receiver to acquire satellite signals even without presence of jamming signals. The problem may be particularly noticeable if the antenna is installed on an aircraft, especially if the antenna is recessed into the skin of the aircraft.

SUMMARY

In one aspect, embodiments of the inventive concepts disclosed herein are directed to a signal acquisition method. The method may include identifying a list of available beam patterns that an antenna unit is configured to provide; iteratively searching for satellite signals by controlling the antenna unit to utilize one of the list of available beam patterns in each iteration; determining whether a satellite signal is detected in each iteration; collecting ephemeris data of a satellite producing the satellite signal when the satellite signal is detected in each iteration; and controlling beamforming operations of the antenna unit for satellite signal acquisition based on the ephemeris data collected.

In a further aspect, embodiments of the inventive concepts disclosed herein are directed to a receiver. The receiver may include an antenna unit and at least one processor in communication with the antenna unit. The least one processor may be configured to: identify a list of available beam patterns that the antenna unit is configured to provide; iteratively search for satellite signals by controlling the antenna unit to utilize one of the list of available beam patterns in each iteration; determine whether a satellite signal is detected in each iteration; collect ephemeris data of a satellite producing the satellite signal when the satellite signal is detected in each iteration; and control beamforming operations of the antenna unit for satellite signal acquisition based on the ephemeris data collected.

In another aspect, embodiments of the inventive concepts disclosed herein are directed to a GPS receiver. The GPS receiver may include an antenna unit and at least one processor in communication with the antenna unit. The least one processor may be configured to: identify a list of available beam patterns that the antenna unit is configured to provide; iteratively search for GPS signals by controlling the antenna unit to utilize one of the list of available beam patterns in each iteration; determine whether a GPS signal is detected in each iteration; collect ephemeris data of a GPS satellite producing the GPS signal when the GPS signal is detected in each iteration; and control beamforming operations of the antenna unit for GPS signal acquisition based on the ephemeris data collected.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying figures in which.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to satellite signal acquisition techniques and receivers utilizing such satellite signal acquisition techniques. More specifically, beamforming antenna electronics may be configured to splay the beams in an optimal fashion to provide maximum sky coverage and significant gain improvement, allowing a receiver configured in accordance with the inventive concepts disclosed herein to take advantages of the beamforming abilities of the antenna electronics when searching for satellites.

Figure 1:
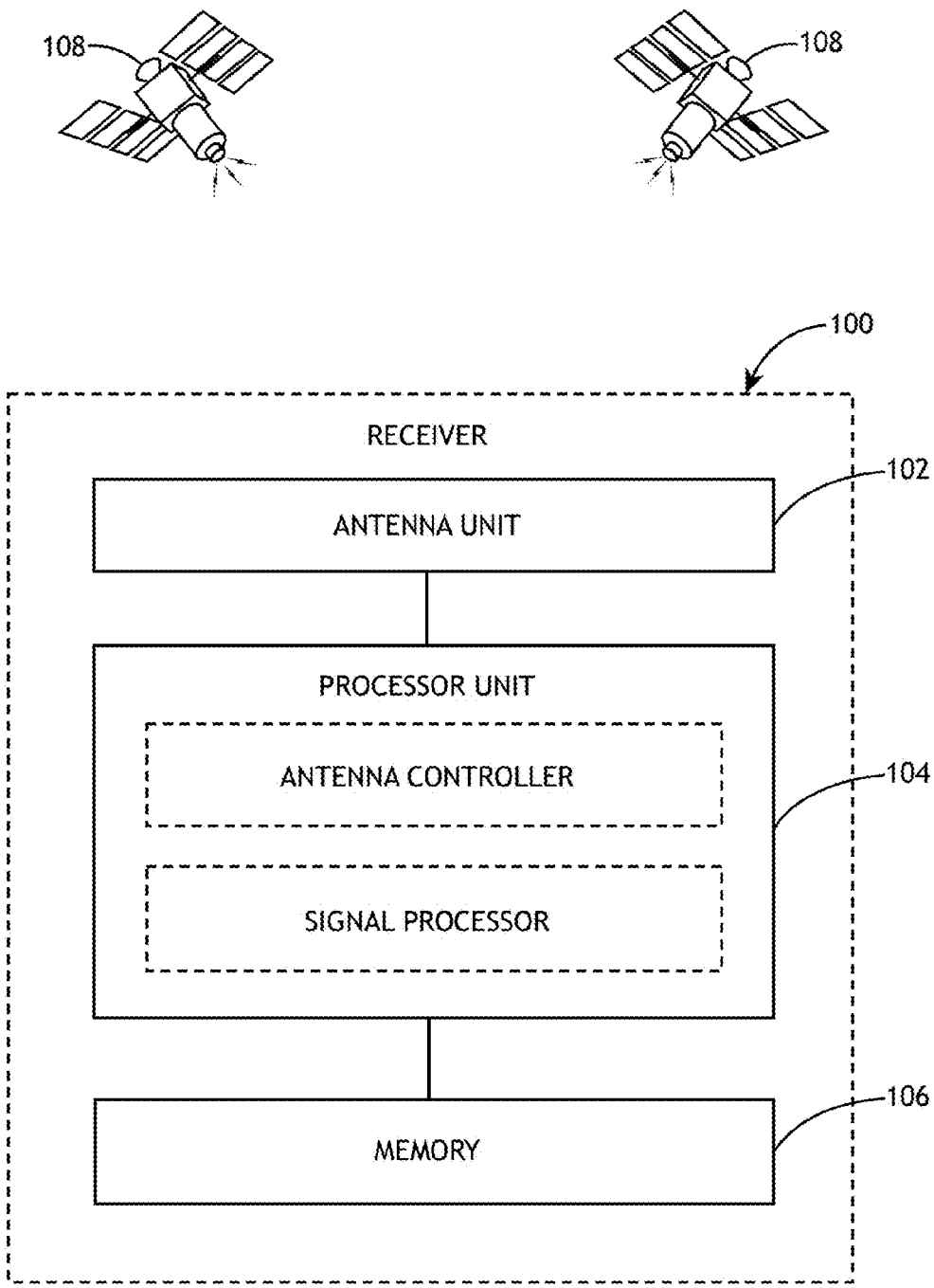
FIG. 1 is a block diagram depicting a satellite signal receiver according to an exemplary embodiment of the inventive concepts disclosed herein.

Referring to FIG. 1, a simplified block diagram depicting a receiver 100 configured according to an exemplary embodiment of the inventive concepts disclosed herein is shown. For illustrative purposes, specific references to the Global Positioning System (GPS) may be utilized in some of the examples described below. It is to be understood, however, that the receiver 100 and the signal acquisition method utilized by the receiver 100 may be applicable to acquire other types of signals without departing from the broad scope of the inventive concepts disclosed herein.

As shown in FIG. 1, the receiver 100 may include an antenna unit 102 in communication with a processor unit 104. The processor unit 104 may include one or more processors configured to control operations of the antenna unit 102 and to process signals received at the antenna unit 102. It is contemplated that the one or more processors may be implemented as dedicated processing devices, application-specific integrated circuits (ASICs), field-programmable gate arrays (FPGAs) or various other types of processors or processing devices.

The antenna unit 102 may include one or more antennas with beamforming abilities. The beamforming abilities of the antenna unit 102 may allow the antenna unit 102 to form a number of beam patterns. In case of GPS receivers, for example, the antenna unit 102 may include a controlled reception pattern antenna (CRPA).

Figure 2:
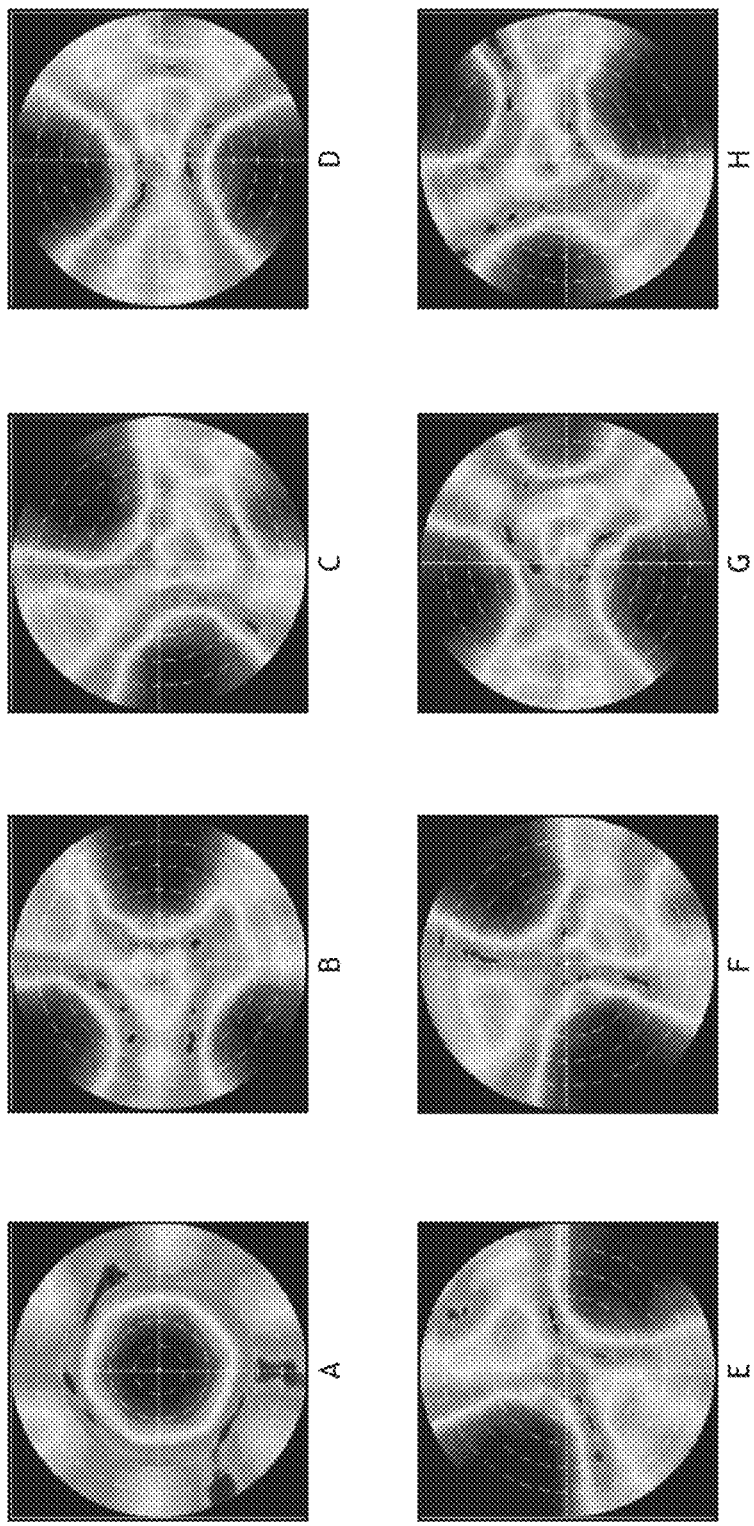
FIG. 2 is an illustration depicting beam patterns that may be formed by an antenna unit of a satellite signal receiver.

FIG. 2 is an illustration depicting various beam patterns that may be provided for the GPS L1 frequency utilizing an exemplary antenna unit 102. For illustrative purposes, an exemplary sixteen-beam connection between the antenna unit 102 and the processor unit 104 is depicted, where eight of the sixteen beam patterns may be used for the GPS L1 frequency and the other eight of the sixteen beam patterns may be used for the GPS L2 frequency. It is noted that only the GPS L1 frequency is depicted in FIG. 2 because the GPS L1 frequency is utilized by the GPS satellites to transmit Coarse/Acquisition (C/A) code for signal acquisition purposes. It is to be understood that beam patterns may be provided for other frequencies without departing from the broad scope of the inventive concepts disclosed herein. It is also to be understood that the antenna unit 102 may be able to form beam patterns that are different from those depicted in FIG. 2 (in terms of numbers and/or coverage areas) without departing from the broad scope of the inventive concepts disclosed herein.

Figure 3:
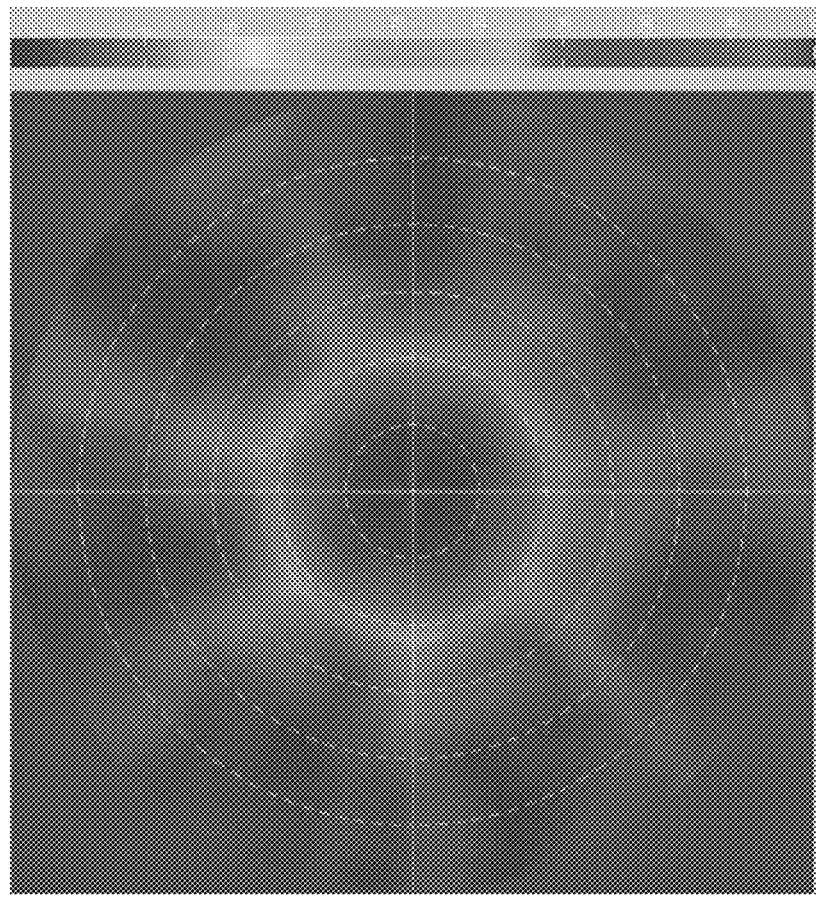
FIG. 3 is an illustration depicting a summation of the beam patterns shown in FIG. 2.

For illustrative purposes, however, suppose the antenna unit 102 is capable of providing eight beam patterns labeled patterns A through H for the GPS L1 frequency as shown in FIG. 2. It is noted that while each particular beam pattern shown in FIG. 2 may be focused primarily on a relatively small portion of the sky, the sum of the coverage provided by all of the beam patterns A through H, as depicted in FIG. 3, may effectively cover substantially the entire sky above the antenna unit 102. Therefore, instead of using the antenna unit 102 in a pass through mode to provide an omnidirectional gain pattern in an attempt to search the sky, an iterative process may be utilized to iteratively search for satellite signals one beam pattern at a time until desired satellite signals have been acquired successfully and/or until all available beam patterns have been exhausted. It certain implementations, the iterative search process may be repeated until at least the desired number of satellite signals have been acquired.

It is noted that searching for satellite signals one beam pattern at time allows the antenna unit 102 to produce significantly more gain within a given portion of the sky in comparison to the gain provided within the same portion of the sky if an omnidirectional pattern is utilized. It is noted that providing more gain effectively improves the ability of the receiver 100 to acquire satellite signals, and any shortcomings associated with limited coverage areas may be effectively mitigated as the result of the iterative process, which eventually covers substantially the same area as an omnidirectional pattern would. It may therefore be beneficial to configure the antenna unit 102 to carry out the iterative search process as described above.

Figure 4:
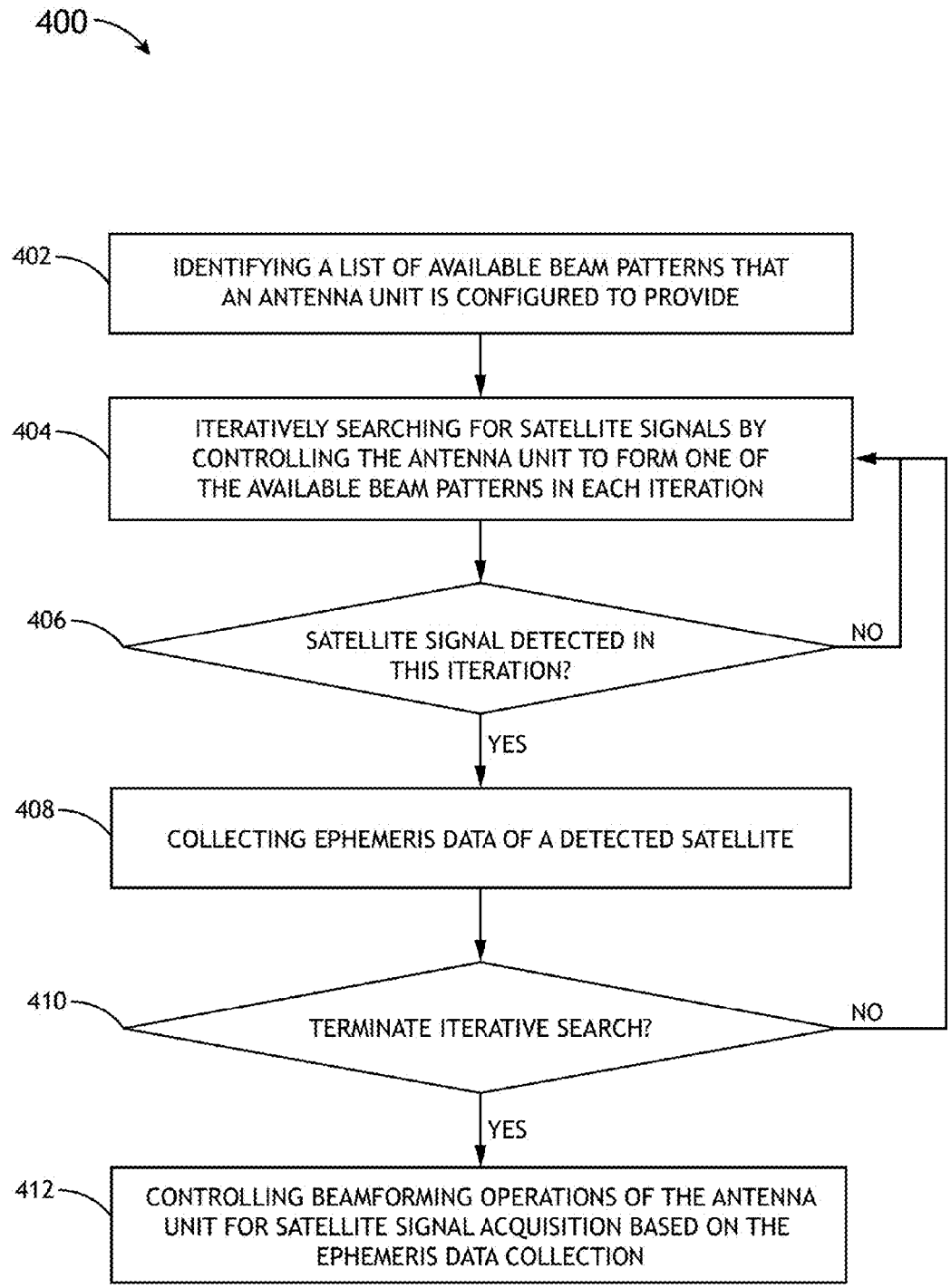
FIG. 4 is a flow diagram depicting a satellite signal acquisition method according to an exemplary embodiment of the inventive concepts disclosed herein.

FIG. 4 is a flow diagram depicting a satellite signal acquisition method 400 that may be utilized by the processor unit 104 to control the operations of the antenna unit 102 during satellite signal acquisition. Referring generally to FIGS. 1-4, a list of available beam patterns A through H that the antenna unit 102 is capable of providing may be identified in a step 402. A step 404 may be carried out iteratively to activate one particular beam pattern out of the list of available beam patterns for the purpose of searching for satellite signals. If it is determined in a step 406 that no satellite signal is detected utilizing the particular beam pattern activated in the step 404, the step 404 may be repeated to activate another beam pattern out of the list of available beam patterns. On the other hand, if satellites signal(s) have been detected utilizing the beam pattern activated in the step 404, ephemeris data of the satellite(s) 108 producing the detected satellite signal(s) may be collected and stored in one or more non-transitory processor-readable memories 106 in a step 408. The method 400 may repeat again from the step 404 until all available beam patterns have been exhausted, or repeat until ephemeris data of at least a predetermined number of satellites have been successfully collected (e.g., four or more satellites in case of GPS receivers), in which case the method 400 may terminate in a step 410. Subsequently, the ephemeris data of the various satellites collected may be utilized to control beamforming operations of the antenna unit 102 to acquire satellite signals in a step 412.

It is contemplated that the satellite signal acquisition method 400 may be utilized as long as the location and attitude of the receiver 100 remain relatively static or deterministic for the duration of the acquisition process. It is noted that a GPS receiver 100 installed on an aircraft may utilize the satellite signal acquisition method 400 without any significant concerns because modern implementations of GPS receivers 100 may be able to complete the acquisition process within a period of time that the location and attitude of the aircraft (and hence the GPS receiver 100 installed on the aircraft) may be considered relatively static. It is also noted that even if an aircraft changes its position very rapidly during the acquisition process, the satellite signal acquisition method 400 may still be applicable by compensating for the location and/or attitude changes of the aircraft (e.g., determined utilizing an inertial navigation system or the like co-located on the aircraft).

It is to be understood that the specific references to GPS receivers in the examples above are merely exemplary and are not meant to be limiting. It is contemplated that any satellite signal receiver 100 utilizing antennas 102 with beamforming abilities may implement the satellite signal acquisition method 400 without departing from the broad scope of the inventive concepts disclosed herein. It is also to be understood that the specific references to receivers installed on aircraft are merely exemplary and are not meant to be limiting. It is contemplated that receivers 100 configured in accordance with the inventive concepts disclosed herein may be utilized by various mobile and/or stationary platforms without departing from the broad scope of the inventive concepts disclosed herein.

It is also to be understood that the specific references to GPS satellites in the examples above are merely exemplary. It is contemplated that receivers 100 configured in accordance with the inventive concepts disclosed herein may be utilized to acquire signals from other types of satellites and/or satellite constellations, including satellites that orbit in Low Earth Orbit (LEO). It is also contemplated that receivers 100 configured in accordance with the inventive concepts disclosed herein may be utilized in other types of systems (in addition to navigation systems). For instance, a communication system that supports two-way data transmissions with one or more satellites may utilize one or more receivers 100 without departing from the broad scope of the inventive concepts disclosed herein. It is further contemplated that the receivers 100 may be adapted to search for signals originated from other sources in addition to satellite signals without departing from the broad scope of the inventive concepts disclosed herein.

Further, it is to be understood that the specific reference to a sixteen-beam antenna unit 102 capable of forming eight beam patterns in the GPS L1 frequency to facilitate satellite signal acquisition is merely exemplary. It is contemplated that antenna units 102 capable of forming more (or less) than eight beam patterns may be utilized to facilitate satellite signal acquisition without departing from the broad scope of the inventive concepts disclosed herein. In certain instances, the abilities to form more beam patterns with closer angular spacing may be appreciated.

It is to be understood that embodiments of the inventive concepts disclosed herein may be conveniently implemented in forms of a software, hardware or firmware package. Such a package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that the specific order or hierarchy of steps in the processes disclosed is an example of exemplary approaches. It is to be understood that the specific order or hierarchy of steps in the processes may be rearranged while remaining within the broad scope of the inventive concepts disclosed herein. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A signal acquisition method, comprising:
   identifying a list of available beam patterns that an antenna unit is configured to provide, the antenna unit including at least one beamforming antenna;
   iteratively searching for satellite signals by controlling the antenna unit to utilize one of the list of available beam patterns in each iteration;
   determining whether a satellite signal is detected in each iteration;
   collecting ephemeris data of a satellite producing the satellite signal when the satellite signal is detected in each iteration; and
   controlling operation of the antenna unit for satellite signal acquisition based on the ephemeris data collected, wherein the at least one beamforming antenna is configured based upon the ephemeris data.

2. The method of claim 1, further comprising:
   terminating the iteratively searching step when the ephemeris data of at least a predetermined number of satellites have been successfully collected.

3. The method of claim 1, further comprising:
   terminating or repeating the iteratively searching step when the list of available beam patterns have been exhausted.

4. The method of claim 1, wherein the antenna unit is configured to receive Global Positioning System (GPS) signals transmitted by a number of GPS satellites.

5. The method of claim 4, wherein a summation of the list of available beam patterns covers substantially an entire sky above the antenna unit.

6. A receiver, comprising:
   an antenna unit, the antenna unit including at least one beamforming antenna; and
   at least one processor in communication with the antenna unit, the least one processor configured to:
      identify a list of available beam patterns that the antenna unit is configured to provide;
      iteratively search for satellite signals by controlling the antenna unit to utilize one of the list of available beam patterns in each iteration;
      determine whether a satellite signal is detected in each iteration;
      collect ephemeris data of a satellite producing the satellite signal when the satellite signal is detected in each iteration; and
      control operation of the antenna unit for satellite signal acquisition based on the ephemeris data collected, wherein the at least one beamforming antenna is configured based upon the ephemeris data.

7. The receiver of claim 6, wherein the at least one processor is further configured to:
   terminate the iterative search when the ephemeris data of at least a predetermined number of satellites have been successfully collected.

8. The receiver of claim 6, wherein the at least one processor is further configured to:
   terminate or repeat the iterative search when the list of available beam patterns have been exhausted.

9. The receiver of claim 6, wherein the antenna unit is configured to receive Global Positioning System (GPS) signals transmitted by a number of GPS satellites.

10. The receiver of claim 9, wherein the antenna unit includes at least one controlled reception pattern antenna (CRPA).

11. The receiver of claim 10, wherein a summation of the list of available beam patterns covers substantially an entire sky above the antenna unit.

12. The receiver of claim 11, wherein the beam patterns are in GPS L1 frequency.

13. The receiver of claim 6, further comprising:
   a non-transitory processor-readable memory configured to store the ephemeris data collected.

14. A Global Positioning System (GPS) receiver, comprising:
   an antenna unit, the antenna unit including at least one beamforming antenna; and
   at least one processor in communication with the antenna unit, the least one processor configured to:
      identify a list of available beam patterns that the antenna unit is configured to provide;
      iteratively search for GPS signals by controlling the antenna unit to utilize one of the list of available beam patterns in each iteration;
      determine whether a GPS signal is detected in each iteration;
      collect ephemeris data of a GPS satellite producing the GPS signal when the GPS signal is detected in each iteration; and
      control operation of the antenna unit for GPS signal acquisition based on the ephemeris data collected, wherein the at least one beamforming antenna is configured based upon the ephemeris data.

15. The GPS receiver of claim 14, wherein the at least one processor is further configured to:
   terminate the iterative search when the ephemeris data of at least a predetermined number of GPS satellites have been successfully collected.

16. The GPS receiver of claim 14, wherein the at least one processor is further configured to:
   terminate or repeat the iterative search when the list of available beam patterns have been exhausted.

17. The GPS receiver of claim 14, wherein the antenna unit includes at least one controlled reception pattern antenna (CRPA).

18. The GPS receiver of claim 17, wherein a summation of the list of available beam patterns covers substantially an entire sky above the antenna unit.

19. The GPS receiver of claim 18, wherein the beam patterns are in GPS L1 frequency.

20. The GPS receiver of claim 14, further comprising:
   a non-transitory processor-readable memory configured to store the ephemeris data collected.

* * * * *